(12) United States Patent
Aidan et al.

(10) Patent No.: US 12,248,368 B2
(45) Date of Patent: Mar. 11, 2025

(54) MEMORY DEVICE AND MODULE LIFE EXPANSION

(71) Applicant: Google LLC, Mountain View, CA (US)

(72) Inventors: Fabrice Aidan, Ramat HaSharon (IL); Evgeni Krimer, Haifa (IL)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/127,425

(22) Filed: Mar. 28, 2023

(65) Prior Publication Data

US 2024/0330108 A1   Oct. 3, 2024

(51) Int. Cl.
*G06F 11/00* (2006.01)
*G06F 11/10* (2006.01)

(52) U.S. Cl.
CPC ...... *G06F 11/1024* (2013.01); *G06F 11/1044* (2013.01); *G06F 11/1064* (2013.01)

(58) Field of Classification Search
CPC ............. G06F 11/1044; G06F 11/1064; G06F 11/0727; G06F 11/1024; G06F 11/1402
See application file for complete search history.

(56) References Cited

U.S. PATENT DOCUMENTS

| | | | | |
|---|---|---|---|---|
| 4,209,846 A * | 6/1980 | Seppa | ................. | G06F 11/1024 714/54 |
| 4,255,808 A * | 3/1981 | Schaber | .............. | G06F 11/0724 714/E11.029 |
| 7,971,112 B2 | 6/2011 | Murata | | |
| 2006/0112306 A1* | 5/2006 | Chessin | .............. | G06F 11/1024 714/6.32 |
| 2008/0010566 A1* | 1/2008 | Chang | ................. | G06F 11/1024 714/E11.045 |
| 2010/0185897 A1 | 7/2010 | Abts et al. | | |
| 2012/0079351 A1* | 3/2012 | Cideciyan | ........... | G06F 11/1048 714/801 |
| 2016/0284424 A1 | 9/2016 | Das et al. | | |
| 2017/0123879 A1* | 5/2017 | Donlin | .................. | G06F 11/079 |
| 2017/0269979 A1* | 9/2017 | Gollub | .................. | G06F 11/076 |
| 2018/0046541 A1* | 2/2018 | Niu | ..................... | G06F 11/1048 |
| 2019/0179704 A1 | 6/2019 | Niu et al. | | |
| 2023/0063804 A1 | 3/2023 | Kim | | |

FOREIGN PATENT DOCUMENTS

| | | |
|---|---|---|
| JP | H0816483 A | 1/1996 |
| WO | 2022116706 A1 | 6/2022 |
| WO | 2022139849 A1 | 6/2022 |

OTHER PUBLICATIONS

Extended European Search Report for European Patent Application No. 23194720.1 dated Jan. 31, 2024. 7 pages.

(Continued)

*Primary Examiner* — Joseph D Manoskey
(74) *Attorney, Agent, or Firm* — Lerner David LLP (57) ABSTRACT

Aspects of the disclosed technology include techniques and mechanisms for an efficient error correction coding scheme that can detect and correct data errors that may occur in a memory. In general, the scheme comprises segmenting the data that would be transferred as part of a data request into different parts and applying error correction codes to the separate parts.

25 Claims, 5 Drawing Sheets

(56) References Cited

OTHER PUBLICATIONS

Kim et al., "Bamboo ECC: Strong, Safe, and Flexible Codes for Reliable Computer Memory," 2015 IEEE 21st International Symposium on High Performance Computer Architecture (HPCA), Burlingame, CA, USA, 2015. 12 pages.
Kim and Erez, "Balancing Reliability, Cost, and Performance Tradeoffs with FreeFault," 2015 IEEE 21st International Symposium on High Performance Computer Architecture (HPCA), Burlingame, CA, USA, 2015. 13 pages.
Lavery, "Discriminating Between Soft Errors and Hard Errors in RAM," Application Report SPNA109, Texas Instruments, Jul. 2008. 5 pages.
Li et al., "From Correctable Memory Errors to Uncorrectable Memory Errors: What Error Bits Tell," The International Conference for High Performance Computing, Networking, Storage, and Analysis (SC22), Dallas, TX, USA, 2022. 14 pages.
Li et al., "Short Paper: A Memory Soft Error Measurement on Production Systems," 2007 USENIX Annual Technical Conference (USENIX ATC 07), Santa Clara, CA, USA, 2007, pp. 275-280.
Extended European Search Report for European Patent Application No. 23216912.8 dated May 16, 2024. 11 pages.
International Search Report and Written Opinion for International Application No. PCT/US2024/019707 dated Jun. 17, 2024. 11 pages.

\* cited by examiner

MEMORY DEVICE AND MODULE LIFE EXPANSION

BACKGROUND

Cloud computing, more generally client-server computing, has become a mainstay for many business enterprises as it provides what some consider to be essential computing services offered via the cloud (e.g., a network of servers, storage, databases, software, and other equipment and services made available by cloud platform providers such as Google) that result in operational and cost advantages. Cloud services (e.g., SaaS, PaaS, IaaS) are typically provided via data centers located at different geographic locations. Each data center usually houses various computing resources and other network equipment that receive, process, and/or store voluminous amounts of data arriving at the datacenter and transmit processed data to other data centers or end user devices (e.g., servers, personal computers, cellular devices, or, more generally, client devices).

Dynamic Random Access Memory (DRAM) plays an important, if not critical, role in the data processing that takes place in a data center. As data processing needs have increased, so has the size of DRAMs. DRAM components are vulnerable to faults. DRAM faults have a deleterious effect on the performance of services offered via data centers. For example, DRAM faults or errors can lead to hardware and/or software systems crashes. These faults include a single bit in the DRAM flipping to its opposite state (e.g., '1' to '0' or vice versa) or multiple bits flipping from their correct states.

Error correction codes (ECCs) are used to detect and protect against memory errors in, for example, DRAMs. ECCs are added to the DRAM by a memory controller. The number of bits used to form an ECC impacts the capacity of the code to detect and correct multiple errors, as well as the size of the DRAM, since additional storage capacity is required of the DRAM to store the ECC. If the number of bits impacted by errors is beyond the limit of the ECC's correction capability, the error is typically uncorrectable, resulting in a system shutdown or crash. If the detected errors are correctable using the ECC, the data can be corrected, allowing the system to continue performing its tasks.

Memory errors can also exhibit a temporal characteristic. For example, an error may be transient, intermittent, or permanent. Transient errors are errors that occur more infrequently (e.g., once) within some predetermined time period or predetermined number of memory transactions than intermittent ones (e.g., multiple times). Permanent errors are errors that occur with every memory transaction. Transient or intermittent errors are typically just logged by the memory system, e.g., memory controller. Permanent errors, on the other hand, almost always require replacement of the memory module (e.g., Dual In-line Memory Module ("DIMM")). In addition, with aging, a DRAM device can reach a point where four or more data symbols exhibit permanent errors, thereby requiring replacement of the DIMM with the faulty device. Damaged hardware typically initially exhibits one or more intermittent correctable errors, which, with time, can become permanent correctable errors, and finally, if an additional hardware fault appears, it could lead to permanent uncorrectable errors.

SUMMARY

Aspects of the disclosed technology may comprise a process, apparatus or system associated with managing detection errored data in a memory device such as a DRAM for example.

For example, an aspect of the disclosed may comprise a process for managing detection of errored data in a memory device. The process comprises obtaining, in response to a read access request to the memory device, data and a first error correction code associated with the data obtained, determining that the data obtained contains an error based on the first error correction code, determining a temporal characteristic associated with the error, including whether the error is transient, intermittent, or permanent, determining a spatial characteristic associated with the error, including whether the error is associated with one or more memory addresses or one or more output pins of the memory device, and responsive to determining that the error is intermittent or permanent and the determined spatial characteristic, adapting operations associated with a memory address or an output pin associated with the error.

In accordance with this aspect of the disclosed technology, determining the temporal characteristic associated with the error comprises performing one or more additional read access requests to the one or more memory addresses. Further, the error is determined to be transient if the one or more additional read access requests do not cause the error at the one or more memory addresses. Further still, the error is determined to be intermittent if the one or more additional read requests cause the error to occur a predetermined number of times at the one or more memory addresses. Additionally, the predetermined number of times may provide an indication that the error is repeatable at a given memory address of the one or more memory addresses. Further, the error is determined to be permanent if the one or more read requests cause the error to occur each time at the one or more memory addresses.

In accordance with this aspect of the disclosed technology, determining the spatial characteristic associated with the error comprises determining the one or more output pins associated with the error based on a bounded fault map. Further, adapting operations comprises using an erasure code to correct errors that occur on the one or more output pins associated with the error. Further still, the first error correction code comprises a Reed Solomon (RS) coding scheme. In addition, the first error correction may comprise an RS (40, 32, 16) scheme.

In accordance with this aspect of the disclosed technology, adapting operations may comprise mapping the data to a new address if the error is determined to be intermittent or permanent. Further, adapting operations may comprise notifying a host system of the error.

As another example, an aspect of the disclosed technology may comprise an apparatus. The apparatus comprising an interface for communicating with one or more memory devices; a memory controller, the memory controller having logic that causes the memory controller to: issue a read access request to the memory device for data, receive the data and a first error correction code associated with the data, determine that the data obtained contains an error based on the first error correction code, determine a temporal characteristic associated with the error, including whether the error is transient, intermittent, or permanent, determine a spatial characteristic associated with the error, including whether the error is associated with one or more memory addresses or one or more output pins of the memory device, and responsive to determining that the error is intermittent or permanent and the determined spatial characteristic, adapt operations associated with a memory address or an output pin associated with the error.

In accordance with this aspect of the disclosed technology, the memory device comprises a DRAM on a DIMM.

Further, the error is determined to be transient if the one or more additional read access requests do not cause the error at the one or more memory addresses. Further still, the error is determined to be intermittent if the one or more additional read requests cause the error to occur a predetermined number of times at the one or more memory addresses. Additionally, the predetermined number of times may provide an indication that the error is repeatable at a given memory address of the one or more memory addresses. Further, the error is determined to be permanent if the one or more read requests cause the error to occur each time at the one or more memory addresses.

Further in accordance with this aspect of the disclosed technology, the logic causes the memory controller to determine the spatial characteristic by identifying the one or more output pins associated with the error based on a bounded fault map. Further, the logic may cause the memory controller to adapt operations by using an erasure code to correct errors that occur on the one or more output pins associated with the error.

Further in accordance with this aspect of the disclosed technology, the logic causes the memory controller to determine the temporal characteristic associated with the error by performing one or more additional read access requests to the one or more memory addresses. Further, the logic may comprise one or more application specific circuits.

Further in accordance with this aspect of the disclosed technology, the logic causes the memory controller to adapt operations by using an erasure code to correct errors that occur on the one or more output pins associated with the error. Further still, the first error correction code comprises a Reed Solomon (RS) coding scheme. In addition, the first error correction may comprise an RS (40, 32, 16) scheme.

Further in accordance with this aspect of the disclosed technology, the logic causes the memory controller to adapt operations by mapping the data to a new address if the error is determined to be intermittent or permanent. In addition, the logic may cause the memory controller to adapt operations by notifying a host system of the error.

BRIEF DESCRIPTION OF THE DRAWINGS

FIG. 2 illustrates an example of a DDR5 fault pattern.

DETAILED DESCRIPTION

Aspects of the disclosed technology comprise a technique and mechanism that allow for extension of the life of a faulty memory device or module by expanding the ECC code error detection and correction capability for certain hardware faults. For example, the technique and mechanism allow for detecting the temporal nature of an error to determine whether it is transient or permanent. In addition, the technique and mechanism determine whether the error impacts a single address or a pin/DQ. Depending on the nature of the error detected (e.g., transient or intermittent versus permanent, single address versus single DQ), certain actions may be taken to avoid having to replace the entire DIMM that is the source of the error. For example, if an uncorrectable error (UE) is determined to be permanent but only impacting a single address, that address may be remapped (e.g., into the Last Level Cache (LLC) memory) or other measures may need to be taken to avoid having that address used going forward. Alternatively, if a UE is determined to be permanent and impacts multiple addresses (e.g., a single DQ), the impacted DRAM may be replaced in the DIMM. Further, if a UE is determined to be permanent and the location of the error is known, the ECC may be adapted using the erasure code capability of the coding scheme, e.g., Reed Solomon (RS) scheme, to correct the errors.

Figure 1:
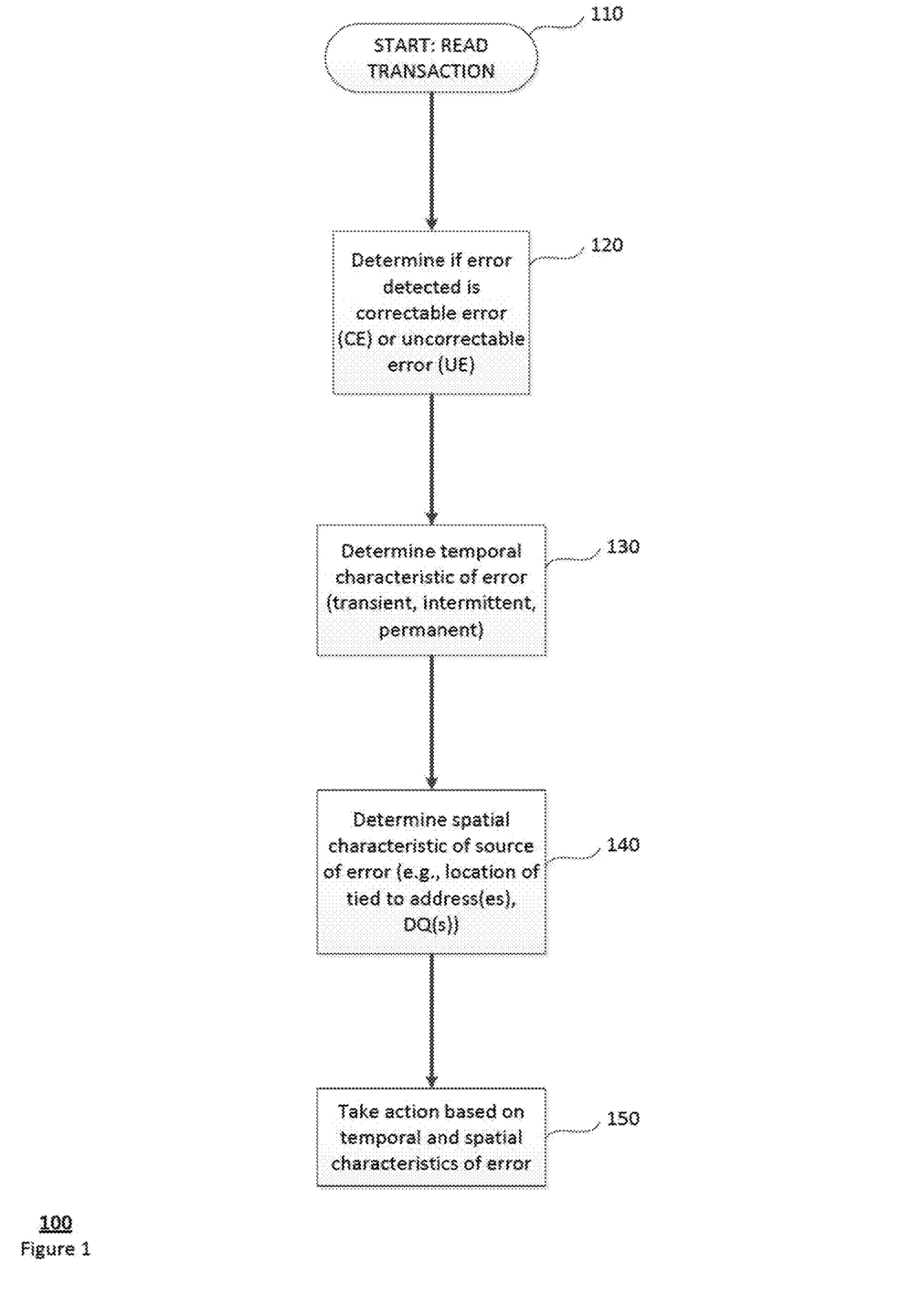
FIG. 1 illustrates a process or method in accordance with an aspect of the disclosed technology.

FIG. 1 illustrates a process or method 100 in accordance with an aspect of the disclosed technology. The process is instantiated or occurs as part of a memory read transaction or read access request, step 110. The read transaction 110 may be the result of a central processing unit (CPU) requesting access to data stored in a memory, such as a DRAM of a DIMM. Such a transaction will cause data stored at the requested memory location to be retrieved and returned along with the original ECC(s) that were also stored along with the data as part of the write transaction. Typically, these read requests are processed through a memory controller.

With regard to error correction code capabilities, an RS error correction code is used as the example coding scheme in explaining aspects of the disclosed technology. Those skilled in the art may recognize that other coding schemes may apply. In general, any error detection and correction scheme that uses redundant bits to encode data and then corrects errors and recovers the original data based on the redundant bits may be employed. The example RS scheme used herein is assumed to include 32 data symbols, 8 ECC symbols, and 16 bits per symbol. The nomenclature for describing this RS scheme is RS (40, 32, 16). The number of ECC symbols, in this case 8, is usually identified using the acronym nECC. An RS (40, 32, 16) scheme can detect and correct up to nECC/2 erroneous symbols (i.e., in the example scheme nECC/2=8/2=4 erroneous symbols), assuming the location of the erroneous symbols is unknown. In a case where the erroneous symbols are known or can be determined, the scheme can correct up to nECC erroneous symbols (i.e., in our example scheme 8 erroneous symbols), which is often referred to as "erasure code" capability. The RS (40, 32, 16) scheme can also handle combinations of known and unknown error locations. Specifically, assuming k known errors, k ECC bits are used to correct these known location errors, leaving the code with the capacity to detect and correct up to (nECC−k)/2 erroneous symbols at unknown locations (also referred to as random error).

In explaining aspects of the disclosed technology, it is also assumed that the memory devices (e.g., DDR5 DRAM devices) make use of the DDR5 standard or architecture, though the disclosed technology can be used with other standards (e.g., DDR4, HBM, etc.). DDR5 DRAM devices used in server applications typically have 4 or 8 DQs. A DQ is an output pin of a DRAM device which drives data upon request. In explaining aspects of the disclosed technology, each DRAM device is assumed to include 4 DQs. A burst access to such a DRAM device is assumed to comprise 16 beats and data is transferred in 64 byte data blocks. A typical DDR5 server configuration is the 10×4 configuration, i.e., 10 DRAM devices each having 4 DQs. Upon request, 4 DQs will drive a 4 bit data bus 16 times (1 bit per DQ for each of 16 beats), resulting in 64 bits or 8 bytes for each DRAM device. For 10 devices, a burst access results in 640 bits or 80 bytes of data. The convention is to use 64 bytes (8 DRAMs) for data and 16 bytes (2 DRAMs) for ECCs.

Returning to FIG. 1, if, as a result of the read transaction 110, an error is detected, processing proceeds to determine whether the detected error is correctable or uncorrectable, step 120. A correctable error (CE) is an error that the ECC is capable of detecting and correcting. An uncorrectable error (UE) is an error that the ECC is capable of detecting but cannot correct. Note too that if no error is detected, processing would proceed normally, with the data being provided to the requesting entity, e.g., the CPU, host, user plane.

With the type of error determined, the process moves to determine the temporal nature of the error, step 130. For example, if the error is determined at step 120 to be a UE, a retry mechanism is invoked as part of step 130 in determining the temporal aspect of the UE. The retry mechanism repeats or resends the same read transaction that initiated the process at step 110 a predetermined number of times. The predetermined number of times includes multiple times, e.g., more than one time and typically between 4 and 8 times, and may be configurable. If, after multiple retries/rereads, the read transaction still includes the UE, this would indicate a permanent error requiring retirement and, ultimately, replacement of the DRAM or other measures that avoid accessing the affected memory region or DRAM device. If, after a certain amount of retries, the error is determined to be correctable, the data is corrected using the ECC and the data is sent to the requestor. In addition, the process further determines whether the error is transient, intermittent, or permanent.

Specifically, in the case where the error is determined to be a CE, either in step 120 or as a result of the retry mechanism, a UE is determined to be a CE as described above, the retry mechanism is invoked as part of step 130. If, after the predetermined number of re-read transactions of the same memory location(s), the error is not repeatable, the error is determined to be transient. If the error is determined to be transient, no further action is required. If the error is repeatable, but does not occur on every re-read, the error is determined to be intermittent. An intermittent error generally indicates that the error may soon be permanent. If the error is repeated with every re-read, the error is determined to be permanent, requiring mitigating action (e.g., remap memory or replace DRAM).

In accordance with the foregoing aspects of the disclosed technology, a technique or mechanism is disclosed to determine the error category and the temporal nature (i.e., transient, intermittent, permanent) of the error. This temporal information is useful in flagging faulty hardware. Specifically, intermittent and permanent errors indicate damaged hardware. This aspect of the disclosed technique or mechanism allows for potentially early detection of hardware that is on the path to being damaged (e.g., intermittent errors detected) and damaged hardware (e.g., permanent errors detected).

At step 140, the spatial characteristics of the error source are determined. Specifically, if the location of intermittent or permanent errors can be determined or is known, the ECC decoding can be adapted by using the erasure code capability of the RS code. Specifically, let's assume the technology is being employed in a DDR5 10×4 DIMM with bounded fault. DDR5 bounded fault is a DDR5 feature that limits fault patterns to specific patterns. A fault refers to the underlying cause of an error, such as a stuck-at bit or high energy particle. An error is an incorrect state that results from a fault, e.g., an incorrect value is returned from memory to a processor or CPU as a result of a data access request. Typically, a DRAM fault affects a particular structure within a DRAM and therefore a single fault can potentially affect a large number of DRAM locations and addresses.

An example of a DDR5 bounded fault pattern 200 is shown in FIG. 2 for devices having four DQs (DQ0-DQ3) that provide burst access over 16 beats (BL0-BL15). As shown in FIG. 2, the faults may be generally divided into two categories: 1) faults which partially or fully impact 2 DQs; and 2) faults which fully impact up to 4 DQs (note that the probability of a fault that partially impacts 4 DQs is negligible and not shown). Faults can be classified as follows: 1) transient; 2) intermittent; and 3) permanent. Transient faults are random, non-repeatable faults, and are expected in normal operation. Transient faults do not indicate damaged hardware. Intermittent faults occur periodically in the same location. Permanent faults repeatedly occur at the same memory location, e.g., every time the memory location is accessed. Intermittent and permanent faults generally indicate damaged hardware. Such damage appears, in general, owing to aging of the memory device.

Returning to step 140, the spatial characteristics of the error may comprise determining the location of the fault of the error. One approach to doing that is to probe memory addresses spatially related to an errored memory address. For instance, a read request may impact a given number of addresses that share some underlying structure in the memory, e.g., a group of memory cells whose access is controlled by a common piece of circuitry. If a read request to one of these addresses results in an ECC error, other related addresses may be accessed and checked to determine whether there are multiple address errors. Multiple address errors may point to a common voltage line or other circuitry that impacts a number of memory addresses. This part of the process may be implemented as follows. Assuming that the read access for an address A results in errored data. Additional read accesses may then be done to address A−2, A−1, A+1, A+2, etc.; or, more generally, addresses within range of address A numerically or spatially, or share common circuitry (e.g., lines). Depending on the error profile resulting from the additional address, the region or circuitry associated with the error may be determined.

With the temporal and spatial characteristics determined, action may be taken to mitigate the effect of the error, step 150. Action need only be taken if the error is determined to be intermittent or permanent. Where the error is determined to be transient, no additional action needs to be taken. In general, the action taken may include a memory controller signaling the CPU, or more generally the host system of the affected addresses, memory regions, or DQs, with the type of error (UE or CE), and its temporal and spatial characteristics. Other actions may include mitigating against the error. For example, if the error is associated with one or more memory addresses, those addresses can be remapped to other addresses or areas in memory. The remapping can include making use of the LLC by remapping the affected memory locations to the LLC. This would result in the data stored in those address locations to be stored in the LLC, such that read requests are diverted to the LLC instead of the affected memory locations. This remapping may be handled entirely within the memory controller without the CPU or host being notified of the errors or hardware faults. Nonetheless, the errored address locations may be flagged, and the CPU/host notified of the nature of the error so that the underlying issue may be dealt with proactively as part of a scheduled maintenance. Regardless of whether the error is flagged and reported, early error and fault detection can be used to extend the life of the memory device and memory module.

As another example of the type of action that may be taken, the ECC coding may be adapted, e.g., by the DRAM controller, by making use of the erasure code capability of the RS code by taking into account the known location of an intermittent or permanent error. For instance, if the error is a permanent error on 2 DQs (e.g., DQe1, DQe2), the new decoding scheme may take into account the erasure of these specific DQs (using 2 ECC bits). As such, the new decoding scheme can correct errors on DQe1 and DQe2 and can detect and correct up to 3 DQ random errors (where the location of the error is unknown). Accordingly, a total of 5 errors may be detected and corrected.

As another example, assume a permanent error is detected on 4 DQs (DQe1 through DQe4). This example is often referred to as chipkill. The new decoding scheme can take into account erasure of these specific DQs (using 4 ECC bit). This new decoding scheme can correct errors on DQe1 through DQe4 and can detect and correct up to 2 DQ random errors (where the location of the error is unknown). Accordingly, a total of 6 errors may be detected and corrected.

In accordance with the disclosed technology, the encoding associated with generating the original ECC values that are stored along with the data does not need to be updated. Rather, only the decoding needs to be updated, i.e., in effect adapting the ECC decoding as discussed above to create a new decoder. As such, the ECC value in the DRAM need not be updated.

As discussed in relation to the case of remapping errored memory locations, being able to effectively deal with permanent errors on the DQ(s) can be used to extend the life of the memory device and module. In addition, the CPU/host may be notified of the errors and their temporal and spatial characteristics, so that mitigating actions may be considered at the software level or via proactive maintenance. In this regard, note that error and fault detection mechanisms of the disclosed technology operate at the hardware and/or micro-architectural level.

More generally, the transient nature of an error may be used to take corrective action that extends the life of a memory device and the DIMM. Those actions include using the decoding scheme to correct intermittent or permanent errors or not using regions in memory that exhibit such errors. Alternatively, when a UE is determined to be intermittent or permanent, the DRAM associated with the UE may be retired (not further used) or replaced. These mitigation measures avoid the conventional approach of replacing the DIMM. Aspects of the disclosed technology enable a number of DRAM errors to be caught at an early stage when they still can be corrected. In addition, using the ECC encoding adaptation, the ECC code capability can be improved by using erasure code capabilities.

Figure 3:
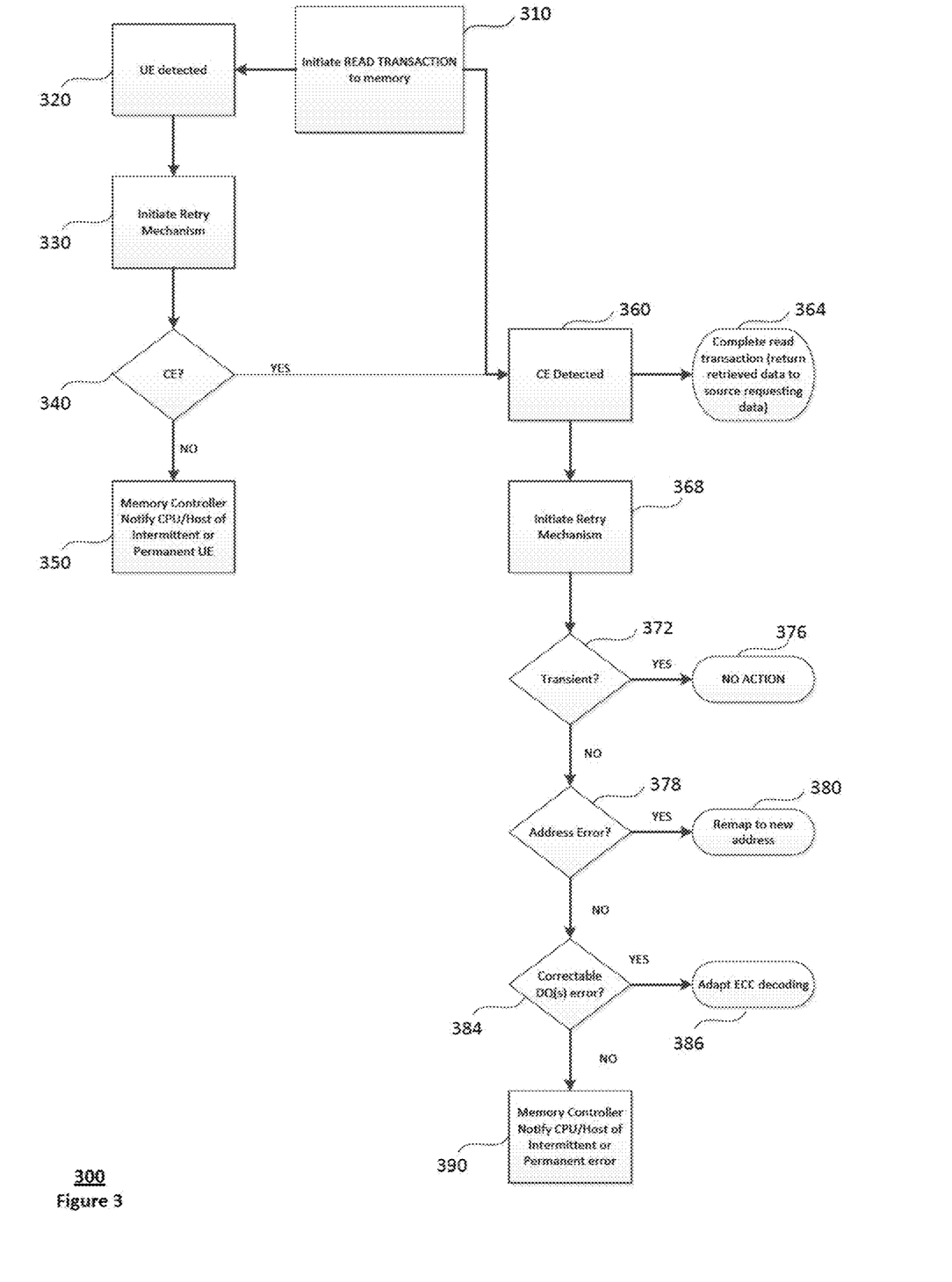
FIG. 3 illustrates a process or method in accordance with an aspect of the disclosed technology.

FIG. 3 illustrates a process or method 300 in accordance with an aspect of the disclosed technology. The process or method 300 is an example of a flow logic in accordance with the disclosed technology. As shown, the process starts with initiation of a read transaction to a memory, step 310. The read transaction can comprise a read access request for data residing at certain addresses in the memory. The memory returns the requested data along with ECCs that were generated by a memory controller when the data was originally written to memory. As part of the read transaction process, the controller also regenerates the ECCs using the retrieved data.

The original ECC and regenerated ECC are then compared to determine whether the retrieved data has errors and the type of errors. If the controller determines that the error is uncorrectable (i.e., UE), processing proceeds to step 320. At step 320, the type of error and address(es) associated with the error may be flagged or stored, e.g., UE. At step 330, a retry mechanism is invoked. As discussed above, the retry mechanism repeats the read request multiple times and, as a part of each read, checks newly computed ECCs against the original ECC. If, as a result of the rereads, it is determined that the error is not a correctable error, as shown via decision diamond 340, processing proceeds to step 350. In other words, if after multiple rereads the error never changes its state as a UE, the result of the rereads serves as a positive indicator that the memory hardware has a permanent fault. As such, at step 350, the CPU or host in which the memory resides can be notified of the UE condition and its temporal error status as permanent. In addition, the associated DRAM may be retired. This may also result in scheduling the DRAM (or DIMM) on which the UE memory region exists to be scheduled for replacement.

As shown, if during the process of rereads occurring at step 330, a determination is made at decision diamond 340 that the previously detected UE is changed status to a CE, processing proceeds to step 360. Step 360 is also arrived at as part of the logic from step 310 if, as part of the initial read transaction 310, it is determined that the error is correctable (i.e., CE). Responsive to determining that the error is a CE, the read transaction is completed and the retrieved data is returned to source that requested it at step 364. The source, for example, may comprise a virtual machine/container running on a host on which the accessed memory resides. Alternatively, the source may comprise a virtual machine/container an application running on a different host.

If the error is determined to be a CE, the controller logic also initiates the retry mechanism at step 368, which operates in the same way as retry mechanism 330 as discussed above. If as a result of running the retry mechanism at step 368, it is determined, as indicated via decision diamond 372, that the detected errors are also transient (e.g., not repeatable), no further action needs to be taken as shown at step 376. If on the other hand, the error is determined to be not transient, i.e., intermittent or permanent, processing proceeds to step 378.

At step 378, a determination is made as to whether the error is limited to one or more address errors. For example, if the error is limited to one or more memory address errors, processing may proceed to step 380, where the memory controller remaps the data to a new address (e.g., using the LLC as discussed above) or other memory location in the memory bank of the DIMM. If, at step 378, it is determined that multiple addresses are impacted, processing may then proceed to decision diamond 384. At decision diamond 384, a determination is made as to which DQs the detected CEs impact and whether the DQ errors are correctable. If the DQ errors are correctable, processing then proceeds to step 386, where the ECC decoding scheme is adapted as previously described above. If the DQ errors are not correctable, processing proceeds to step 390, where the memory controller notifies the host or CPU of the intermittent or permanent error that has been detected.

Figure 4:
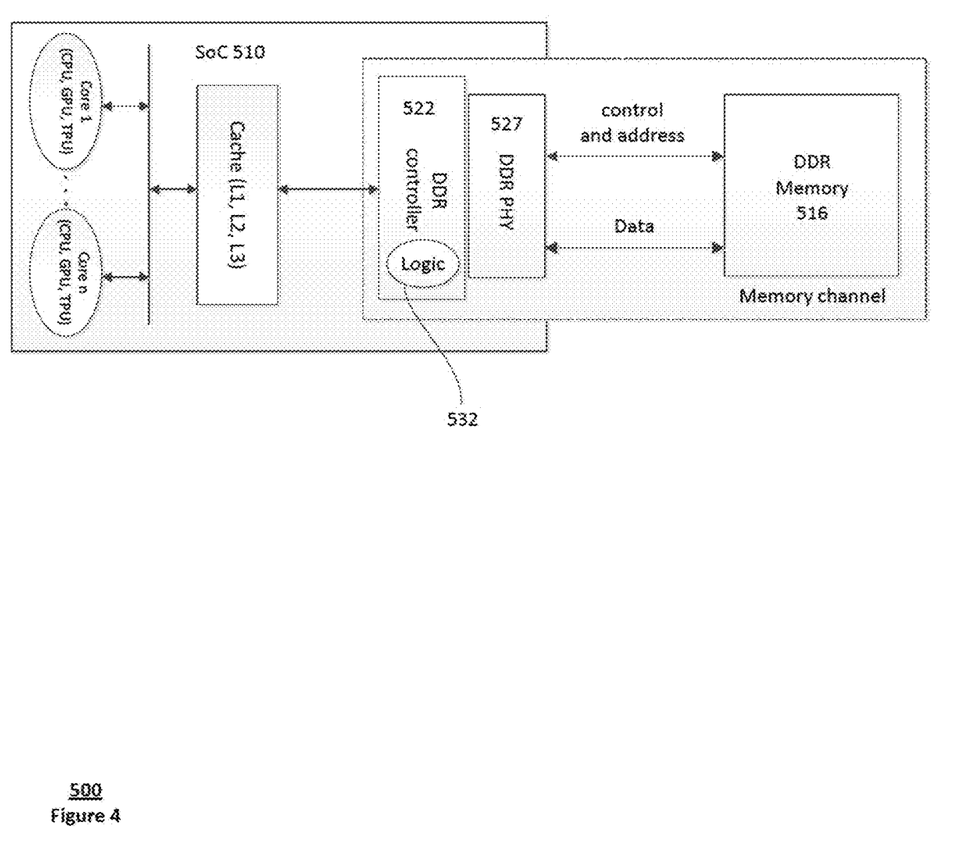
FIG. 4 illustrates a system or apparatus in accordance with an aspect of the disclosed technology.

FIG. 4 illustrates an example of a system 500 in accordance with an aspect of the disclosed technology. In this example, the system 500 includes a system on a chip (SoC) 510 communicatively coupled to a DDR memory 516. DDR memory 516 is shown as one block, but should be understood to also include multiple DRAM devices or one or more DIMMs. The SoC 510 includes a DDR controller 522 and DDR physical interface 527, via which command and address information and data may be transferred between the SoC 510 and DDR memory 516.

The DDR controller 522 includes logic 532 that implements the method or processes discussed above in relation to FIGS. 1 through 3. Specifically, the SoC 510, as part of processing information (e.g., using processing elements forming its one or more cores), may need data to be recalled from DDR memory 516. Logic 532, in the form of one or more instructions, may be configured to implement the process flows of either FIG. 1 or FIG. 3 to decode data being read from DDR memory 516 and determine the temporal and spatial characteristics of detected errors as discussed above. In an example implementation, the temporal and spatial determination logic and adapted decoder can be implemented in hardware logic within DDR controller logic 532.

The system of FIG. 4 may be used in one or more larger systems, such as a server, host, smartphone, personal computer, or, more generally, any electronic device that makes use of a DRAM. As indicated above, DRAM plays an important role in cloud computing systems. In addition, as the size of the DRAMs continues to increase in such systems, the need for schemes that lengthen the life or memory devices or module in accordance with the disclosed technology mitigates against unnecessary expense and disruption in operating the network. As such, the disclosed technology may be implemented in servers or host machines such as those shown in cloud computing system 800 of FIG. 5.

Figure 5:
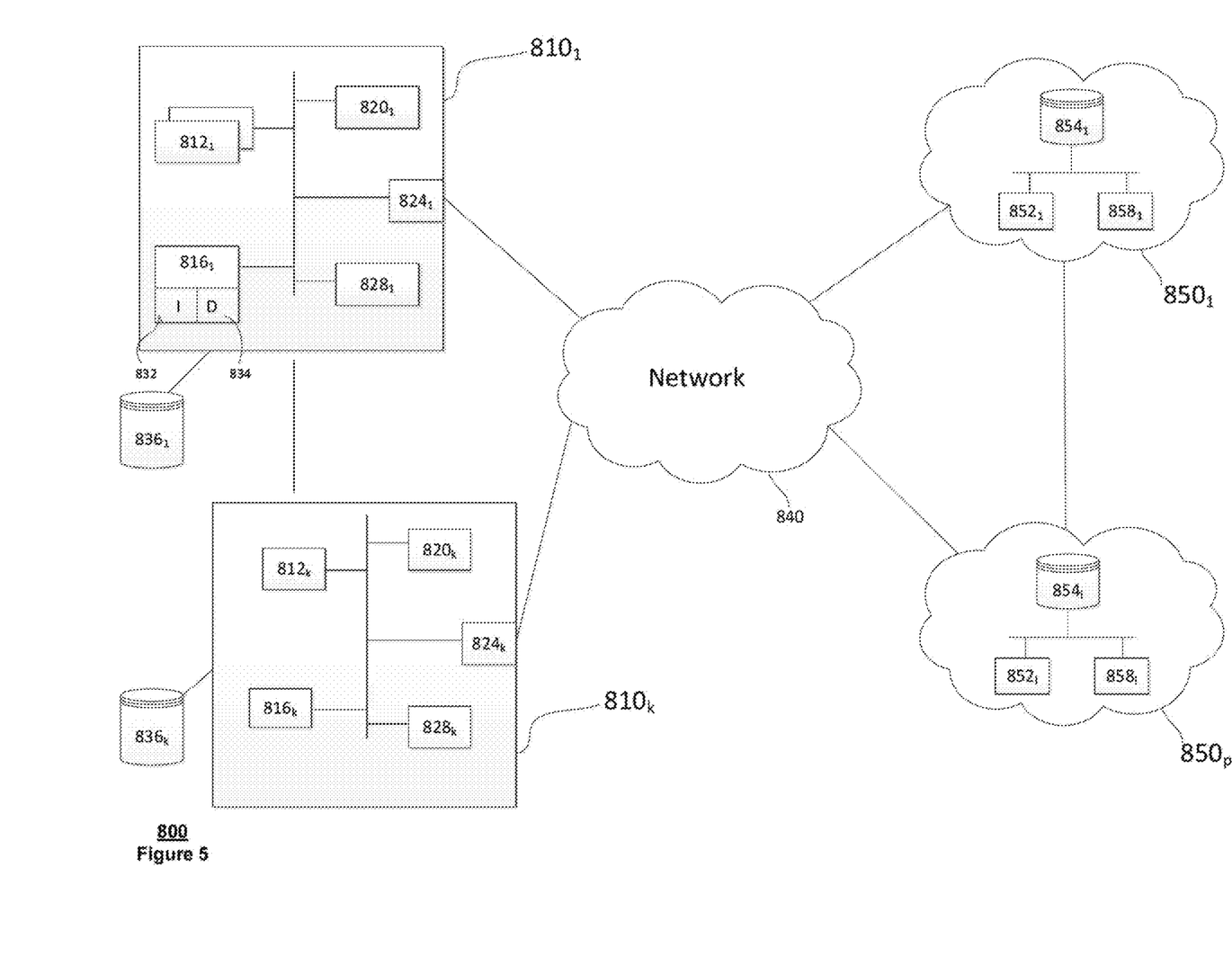
FIG. 5 illustrates a system in accordance with an aspect of the disclosed technology.

FIG. 5 is an example system 800 in accordance with aspects of the disclosure. System 800 includes one or more computing devices 810, which may comprise computing devices $810_1$ through $810_k$, storage 836, a network 840 and one or more cloud computing systems 850, which may comprise cloud computing systems $850_1$ through $850_p$. Computing devices 810 may comprise computing devices located at a customer location that makes use of cloud computing services such as Infrastructure as a Service (IaaS), Platform as a Service (PaaS), and/or Software as a Service (SaaS). For example, if a computing device 810 is located at a business enterprise, computing device 810 may use cloud systems 850 as a service that provides software applications (e.g., accounting, word processing, inventory tracking, etc., applications) to computing devices 810 used in operating enterprise systems. In addition, computing device 810 may access cloud computing systems 850 as part of its operations that employ machine learning, or more generally artificial intelligence technology, to train applications that support its business enterprise. For example, computing device 810 may comprise a customer computer or server in a bank or credit card issuer that accumulates data relating to credit card use by its card holders and supplies the data to a cloud platform provider, who then processes that data to detect use patterns that may be used to update a fraud detection model or system, which may then notify the card holder of suspicious or unusual activity with respect to the card holder's credit. Other customers may include social media platform providers, government agencies, or any other business that uses machine learning as part of its operations.

As shown in FIG. 5, each of computing devices 810 may include one or more processors 812, memory 816 storing data 834 and instructions 832, display 820, communication interface 824, and input system 828. The processors 812 and memories 816 may be communicatively coupled as shown in FIG. 5, and include memory controllers that implement the logic block shown in FIG. 4. Computing device 810 may also be coupled or connected to storage 836, which may comprise local or remote storage, e.g., on a Storage Area Network (SAN), that stores data accumulated as part of a customer's operation. Computing device 810 may comprise a standalone computer (e.g., desktop or laptop) or a server associated with a customer. A given customer may also implement as part of its business multiple computing devices as servers. Memory 816 stores information accessible by the one or more processors 812, including instructions 832 and data 834 that may be executed or otherwise used by the processor(s) 812. The memory 816 may be of any type capable of storing information accessible by the processor, including a computing device-readable medium, or other medium that stores data that may be read with the aid of an electronic device, such as a hard drive, memory card, ROM, RAM, DVD, or other optical disks, as well as other write-capable and read-only memories. Systems and methods may include different combinations of the foregoing, whereby different portions of the instructions and data are stored on different types of media.

The instructions 832 may be any set of instructions to be executed directly (such as machine code) or indirectly (such as scripts) by the processor 812. For example, the instructions may be stored as computing device code on the computing device-readable medium. In that regard, the terms "instructions" and "programs" may be used interchangeably herein. The instructions may be stored in object code format for direct processing by the processor, or in any other computing device language, including scripts or collections of independent source code modules that are interpreted on demand or compiled in advance. Processes, functions, methods, and routines of the instructions are explained in more detail below.

The data 834 may be retrieved, stored, or modified by processor 812 in accordance with the instructions 832. As an example, data 834 associated with memory 816 may comprise data used in supporting services for one or more client devices, applications, etc. Such data may include data to support hosting web-based applications, file share services, communication services, gaming, sharing video or audio files, or any other network-based services.

The one or more processors 812 may be any conventional processor, such as commercially available CPUs. Alternatively, the one or more processors may be a dedicated device such as an ASIC or other hardware-based processor. Although FIG. 5 functionally illustrates the processor, memory, and other elements of computing device 810 as being within the same block, it will be understood by those of ordinary skill in the art that the processor, computing device, or memory may actually include multiple processors, computing devices, or memories that may or may not be located or stored within the same physical housing. In one example, one or more computing devices 810 may include one or more server computing devices having a plurality of computing devices (e.g., a load-balanced server farm) that exchange information with different nodes of a network for the purpose of receiving, processing, and transmitting the data to and from other computing devices as part of customer's business operation.

Computing device 810 may also include a display 820 (e.g., a monitor having a screen, a touch-screen, a projector, a television, or other device that is operable to display information) that provides a user interface that allows for controlling the computing device 810. Such control may include, for example, using a computing device to cause data to be uploaded through input system 828 to cloud system 850 for processing, causing accumulation of data on storage 836, or more generally, managing different aspects of a customer's computing system. While input system 828 may be used to upload data, e.g., a USB port, computing system 800 may also include a mouse, keyboard, touchscreen, or microphone that can be used to receive commands and/or data.

The network 840 may include various configurations and protocols including short range communication protocols such as Bluetooth™, Bluetooth™ LE, the Internet, World Wide Web, intranets, virtual private networks, wide area networks, local networks, private networks using communication protocols proprietary to one or more companies, Ethernet, WiFi, HTTP, etc., and various combinations of the foregoing. Such communication may be facilitated by any device capable of transmitting data to and from other computing devices, such as modems and wireless interfaces. Computing device 810 interfaces with network 840 through communication interface 824, which may include the hardware, drivers, and software necessary to support a given communications protocol.

Cloud computing systems 850 may comprise one or more data centers that may be linked via high speed communications or computing networks. A given data center within system 850 may comprise dedicated space within a building that houses computing systems and their associated components, e.g., storage systems and communication systems. Typically, a data center will include racks of communication equipment, servers/hosts, and disks. The servers/hosts and disks comprise physical computing resources that are used to provide virtual computing resources such as VMs. To the extent that a given cloud computing system includes more than one data center, those data centers may be at different geographic locations within relative close proximity to each other, chosen to deliver services in a timely and economically efficient manner, as well as provide redundancy and maintain high availability. Similarly, different cloud computing systems are typically provided at different geographic locations.

As shown in FIG. 5, computing system 850 may be illustrated as comprising infrastructure 852, storage 854 and computer system 858. Infrastructure 852, storage 854 and computer system 858 may comprise a data center within a cloud computing system 850. Infrastructure 852 may comprise servers, switches, physical links (e.g., fiber), and other equipment used to interconnect servers within a data center with storage 854 and computer system 858. Storage 854 may comprise a disk or other storage device that is partitionable to provide physical or virtual storage to virtual machines running on processing devices within a data center. Storage 854 may be provided as a SAN within the datacenter hosting the virtual machines supported by storage 854 or in a different data center that does not share a physical location with the virtual machines it supports. Computer system 858 acts as supervisor or managing agent for jobs being processed by a given data center. In general, computer system 858 will contain the instructions necessary to, for example, manage the operations requested as part of a synchronous training operation on customer data. Computer system 858 may receive jobs, for example, as a result of input received via an application programming interface (API) from a customer.

Aspects of the disclosed technology may comprise a process, apparatus or system associated with managing detection errored data in a memory device such as a DRAM for example. Such aspects may be implemented so as to include the following features (F1, etc.) and sub-features (clauses listed as included in a feature), individually or combined:

F1. A process for managing detection of errored data in a memory device, comprising:
obtaining, in response to a read access request to the memory device, data and a first error correction code associated with the data obtained,
determining that the data obtained contains an error based on the first error correction code,
determining a temporal characteristic associated with the error, including whether the error is transient, intermittent, or permanent,
determining a spatial characteristic associated with the error, including whether the error is associated with one or more memory addresses or one or more output pins of the memory device, and
responsive to determining that the error is intermittent or permanent and the determined spatial characteristic, adapting operations associated with a memory address or an output pin associated with the error.

F2. The process of F1, wherein determining the temporal characteristic associated with the error comprises performing one or more additional read access requests to the one or more memory addresses.

F3 The process of any one of F1 through F2, wherein the error is determined to be transient if the one or more additional read access requests do not cause the error at the one or more memory addresses.

F4. The process of any one of F1 through F3, wherein the error is determined to be intermittent if the one or more additional read requests cause the error to occur a predetermined number of times at the one or more memory addresses.

F5. The process of any one of F1 through F4, wherein the predetermined number of times provide an indication that the error is repeatable at a given memory address of the one or more memory addresses.

F6. The process of any one of F1 through F5, wherein the error is determined to be permanent if the one or more read requests cause the error to occur each time at the one or more memory addresses.

F7. The process of any one of F1 through F6, wherein determining the spatial characteristic associated with the error comprises determining the one or more output pins associated with the error based on a bounded fault map.

F8 The process of any one of F1 through F7, wherein adapting operations comprises using an erasure code to correct errors that occur on the one or more output pins associated with the error.

F9. The process of any one of F1 through F8, wherein the first error correction code comprises a Reed Solomon (RS) coding scheme.

F10. The process of any one of F1 through F9, wherein the first error correction comprises an RS (40, 32, 16) scheme.

F11. The process of any one of F1 through F10, wherein adapting operations comprises mapping the data to a new address if the error is determined to be intermittent or permanent.

F12. The process of any one of F1 through F11, wherein adapting operations comprises notifying a host system of the error.

F13. An apparatus, comprising:
an interface for communicating with one or more memory devices;

a memory controller, the memory controller having logic that causes the memory controller to:
  issue a read access request to the memory device for data,
  receive the data and a first error correction code associated with the data,
  determine that the data obtained contains an error based on the first error correction code,
  determine a temporal characteristic associated with the error, including whether the error is transient, intermittent, or permanent,
  determine a spatial characteristic associated with the error, including whether the error is associated with one or more memory addresses or one or more output pins of the memory device, and
  responsive to determining that the error is intermittent or permanent and the determined spatial characteristic, adapt operations associated with a memory address or an output pin associated with the error.

F14. The apparatus of F13, wherein the memory device comprises a DRAM on a DIMM.

F15. The apparatus of any one of F13 through F14, wherein the logic causes the memory controller to determine the temporal characteristic associated with the error by performing one or more additional read access requests to the one or more memory addresses.

F16. The apparatus of any one of F13 through F15, wherein the error is determined to be transient if the one or more additional read access requests do not cause the error at the one or more memory addresses.

F17. The apparatus of any one of F13 through F16, wherein the error is determined to be intermittent if the one or more additional read requests cause the error to occur a predetermined number of times at the one or more memory addresses.

F18. The apparatus of any one of F13 through F17, wherein the predetermined number of times provide an indication that the error is repeatable at a given memory address of the one or more memory addresses.

F19. The apparatus of any one of F13 through F18, wherein the error is determined to be permanent if the one or more read requests cause the error to occur each time at the one or more memory addresses.

F20. The apparatus of any one of F13 through F19, wherein the logic causes the memory controller to determine the spatial characteristic by identifying the one or more output pins associated with the error based on a bounded fault map.

F21. The apparatus of any one of F13 through F20, wherein the logic causes the memory controller to adapt operations by using an erasure code to correct errors that occur on the one or more output pins associated with the error.

F22. The apparatus of any one of F13 through F21, wherein the first error correction code comprises a Reed Solomon (RS) coding scheme.

F23 The apparatus of any one of F13 through F22, wherein the first error correction comprises an RS (40, 32, 16) scheme.

F24. The apparatus of any one of F13 through F23, wherein the logic causes the memory controller to adapt operations by mapping the data to a new address if the error is determined to be intermittent or permanent.

F25. The apparatus of any one of F13 through F24, wherein the logic causes the memory controller to adapt operations by notifying a host system of the error.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A process for managing detection of errored data in a memory device, comprising:
  obtaining data and a first error correction code associated with the data obtained and associated with a read access request to the memory device,
  determining that the data obtained contains an error based on the first error correction code,
  determining a temporal characteristic associated with the error, including whether the error is transient, intermittent, or permanent,
  determining a spatial characteristic associated with the error by probing one or more memory addresses spatially related to one or more errored memory addresses associated with the error, and
  responsive to determining that the error is intermittent or permanent and the determined spatial characteristic, adapting operations associated with the one or more errored memory addresses or an output pin associated with the error.

2. The process of claim 1, wherein determining the temporal characteristic associated with the error comprises performing one or more additional read access requests to the one or more errored memory addresses.

3. The process of claim 2, wherein the error is determined to be transient if the one or more additional read access requests do not cause the error at the one or more errored memory addresses.

4. The process of claim 2, wherein the error is determined to be intermittent if the one or more additional read requests cause the error to occur a predetermined number of times at the one or more errored memory addresses.

5. The process of claim 4, wherein the predetermined number of times provide an indication that the error is repeatable at a given memory address of the one or more errored memory addresses.

6. The process of claim 2, wherein the error is determined to be permanent if the one or more read requests cause the error to occur each time at the one or more errored memory addresses.

7. The process of claim 2, wherein adapting operations comprises mapping the data to a new address if the error is determined to be intermittent or permanent.

8. The process of claim 2, wherein adapting operations comprises notifying a host system of the error.

9. The process of claim 1, wherein determining the spatial characteristic associated with the error comprises determining the one or more output pins associated with the error based on a bounded fault map.

10. The process of claim 9, wherein adapting operations comprises using an erasure code to correct errors that occur on the one or more output pins associated with the error.

11. The process of claim 10, wherein the first error correction code comprises a Reed Solomon (RS) coding scheme.

12. The process of claim 11, wherein the first error correction comprises an RS (40, 32, 16) scheme.

13. An apparatus, comprising:
an interface for communicating with one or more memory devices;
a memory controller, the memory controller having logic that causes the memory controller to:
issue a read access request to a memory device, of the one or more memory devices, for data,
receive the data and a first error correction code associated with the data,
determine that the data obtained contains an error based on the first error correction code,
determine a temporal characteristic associated with the error, including whether the error is transient, intermittent, or permanent,
determine a spatial characteristic associated with the error by probing one or more memory addresses spatially related to one or more errored memory addresses associated with the error, and
adapt operations associated with a memory address or an output pin associated with the error based on the error being intermittent or permanent and the spatial characteristic.

14. The apparatus of claim 13, wherein the memory device comprises a DRAM on a DIMM.

15. The apparatus of claim 13, wherein the logic causes the memory controller to determine the temporal characteristic associated with the error by performing one or more additional read access requests to the one or more errored memory addresses.

16. The apparatus of claim 15, wherein the error is determined to be transient if the one or more additional read access requests do not cause the error at the one or more errored memory addresses.

17. The apparatus of claim 15, wherein the error is determined to be intermittent if the one or more additional read requests cause the error to occur a predetermined number of times at the one or more errored memory addresses.

18. The apparatus of claim 17, wherein the predetermined number of times provide an indication that the error is repeatable at a given memory address of the one or more errored memory addresses.

19. The apparatus of claim 15, wherein the error is determined to be permanent if the one or more read requests cause the error to occur each time at the one or more errored memory addresses.

20. The apparatus of claim 13, wherein the logic causes the memory controller to determine the spatial characteristic by identifying the one or more output pins associated with the error based on a bounded fault map.

21. The apparatus of claim 20, wherein the logic causes the memory controller to adapt operations by using an erasure code to correct errors that occur on the one or more output pins associated with the error.

22. The apparatus of claim 21, wherein the first error correction code comprises a Reed Solomon (RS) coding scheme.

23. The apparatus of claim 22, wherein the first error correction comprises an RS (40, 32, 16) scheme.

24. The apparatus of claim 13, wherein the logic causes the memory controller to adapt operations by mapping the data to a new address if the error is determined to be intermittent or permanent.

25. The apparatus of claim 13, wherein the logic causes the memory controller to adapt operations by notifying a host system of the error.

* * * * *